United States Patent
Fleming, III et al.

(10) Patent No.: US 6,282,232 B1
(45) Date of Patent: Aug. 28, 2001

(54) METHODS AND APPARATUS FOR BURST-MODE CDMA DSSS COMMUNICATIONS RECEIVING SYSTEMS

(75) Inventors: Robert F. Fleming, III, Derwood, MD (US); William A. Check, Great Falls, VA (US); Joseph A. Chisholm, Manassas, VA (US); Brian J. Glinsman, Herndon, VA (US); David B. Kim, Great Falls, VA (US); Ronald L. Kronz, Fairfax, VA (US); David G. Decker, Sunnyvale, CA (US); Norman F. Krasner, San Carlos, CA (US)

(73) Assignee: Spacenet, Inc., McLean, VA (US)

( * ) Notice: Subject to any disclaimer, the term of this patent is extended or adjusted under 35 U.S.C. 154(b) by 0 days.

(21) Appl. No.: 09/053,024

(22) Filed: Apr. 1, 1998

Related U.S. Application Data

(60) Provisional application No. 60/042,837, filed on Apr. 9, 1997.

(51) Int. Cl.[7] ............... H04L 27/14; H04L 27/148
(52) U.S. Cl. ............... 375/147; 375/339
(58) Field of Search ............... 375/140, 147, 375/136, 148, 324, 205, 339, 150; 370/335, 342, 320, 441

(56) References Cited

U.S. PATENT DOCUMENTS

| | | | |
|---|---|---|---|
| 5,790,589 | * 8/1998 | Hutchison, IV et al. | 375/200 |
| 5,953,364 | * 9/1999 | Yamamoto | 375/200 |
| 6,160,799 | * 12/2000 | Krause et al. | 370/335 |
| 6,192,040 | * 2/2001 | Jalloul et al. | 370/355 |

* cited by examiner

*Primary Examiner*—Chi Pham
*Assistant Examiner*—Dung X. Nguyen
(74) *Attorney, Agent, or Firm*—Jones Volentine, PLLC

(57) ABSTRACT

A method and apparatus for receiving and processing burst-mode code-division multiple access (CDMA) direct-sequence spread-spectrum (DSSS) signals is provided. In this apparatus and method, a number of demodulators are provided in a set enumerated order. Each demodulator is either "ready," meaning that it is free to process signals, or busy meaning that it is currently processing a signal. The ready demodulators each receive an input IF signal and try to detect a preamble in the IF signal. Once they detect the preamble, each ready demodulator then sends a request signal to an arbitrator. In response to a received request signal, the arbitrator sends a grant signal to the first ready demodulator in the enumerated order. This grant signal passes through each busy demodulator that is higher in the enumerated order than the first ready demodulator. The first ready demodulator then begins processing the signal, and is moved from the set of ready demodulators to the set of busy demodulators. The remaining ready demodulators then continue processing incoming signals. When a busy demodulator completes processing a signal, it is returned to the set of ready demodulators.

8 Claims, 10 Drawing Sheets

METHODS AND APPARATUS FOR BURST-MODE CDMA DSSS COMMUNICATIONS RECEIVING SYSTEMS

This application claims the benefit of U.S. Provisional Application No. 60/042,837, filed Apr. 9, 1997, the contents of which are hereby incorporated by reference.

BACKGROUND OF THE INVENTION

1. Field of the Invention

This invention pertains to communications receiving systems designed to receive multiple burst transmissions, occurring on the same frequency and overlapping in time, using direct-sequence spread-spectrum (DSSS), code-division multiple-access (CDMA), phase-shift-keyed modulation. This type of transmission can be employed in a star-type communications network from the remote nodes to the central node, or in a mesh-type communications network between the nodes, and may or may not include relay stations such as those that would be used in satellite communications networks.

2. Description of the Related Art

Several transmission schemes have been presented for CDMA communications systems. The Telecommunications Industry Association IS-95 forward link (base-to-subscriber-terminal) scheme is an orthogonal synchronous CDMA system in which the spreading sequences used to communicate with different users are Walsh-Hademard functions. These highly orthogonal codes are used to minimize mutual interference between signals addressed to different users. However, there is a need for very precise synchronization to maintain orthogonality between signals transmitted to and by the various users. On the reverse link (subscriber-unit-to-base), each subscriber unit is assigned a unique spreading sequence. These spreading sequences are chosen to have good cross-correlation properties.

The C200 system, developed by Equatorial communications Company, uses an asynchronous scheme that provides one code per very small aperture terminal (VSAT). The spreading sequences used in this system are modified Gold codes. These codes have good asynchronous cross-correlation properties. However, since each VSAT has a unique spreading sequence and any VSAT may transmit at any time, each VSAT requires a dedicated receiver at the hub.

In a paper entitled "Fundamentals of Packet Multiple Access for Satellite Networks," by Norman Abramson (IEEE Journal on Selected Areas in Communications, Vol. 10, No. 2, February 1992), the author suggests a transmission scheme for VSAT terminals that he refers to as "spread ALOHA." In this scheme, all users would employ the same spreading sequence. This spreading sequence would be chosen to have a good autocorrelation peak and low autocorrelation sidelobes. The hub earth station would transmit a pilot signal to facilitate the synchronization of the transmissions from the various VSATs in the network. However, Abramson does not describe how to implement a hub earth station receiving system for multiple simultaneous inbound VSAT transmissions. Moreover, the capacity of such a system in terms of the number of simultaneous users depends heavily on the length of the spreading sequence employed (and hence the satellite transponder bandwidth required for a given inbound data rate, coding, and modulation technique) and how well the VSAT system can be synchronized.

To overcome the technical difficulties of the synchronization of various transmitters and the economic problems of requiring a dedicated receiver for each possible transmitter, a new CDMA transmission and reception scheme is needed. This scheme should operate like a conventional TDMA or FDMA scheme in that a set of receiving system resources can be shared between multiple users whose transmissions do not collide with one another. It should also not impose burdensome synchronization requirements for successful operation. It is therefore desirable to provide a system for properly routing incoming signals to a plurality of demodulators in a manner that will avoid the problems set forth above.

SUMMARY OF THE INVENTION

It is an object of this invention to provide an effective and efficient receiving system for asynchronous, direct-sequence spread-spectrum (DSSS) code-division multiple-access (CDMA) burst transmissions wherein the transmitting stations use a common spreading sequence or choose from a small set of spreading sequences.

It is another object of this invention to provide an assignment mechanism such that as long as overlapping DSSS CDMA signals that are nearly simultaneously received are spread with different spreading sequences, or received with a spreading sequence epoch difference of more than one or two chips, they will be detected and assigned to different demodulator channels within a pool of demodulator channels for demodulation.

It is yet another object of this invention to provide an assignment mechanism that assigns one and only one demodulator channel to demodulate each received signal.

It is still another object of this invention to provide an assignment mechanism that is economical to implement.

Another object of this invention is to provide an assignment mechanism that facilitates the reception of different signals using the same spreading sequence, data rate, and frequency with minimal time-separation between their spreading sequence epochs, or symbol boundaries.

A further object of this invention is to provide a demodulator assignment mechanism that maximizes the efficiency of a pool of burst DSSS CDMA demodulators.

According to one aspect of the present invention, a method is provided for receiving and processing burst-mode code-division multiple access (CDMA) direct-sequence spread-spectrum (DSSS) signals, the method comprising the steps of receiving a data signal at first through $k^{th}$ demodulators, the first through $k^{th}$ demodulators being set in a first enumerated order and divided into a set of m ready demodulators and a set of n busy demodulators, the ready demodulators being set in a second enumerated order analogous to their order in the first enumerated order, detecting a preamble in the data signal at the ready demodulators, sending one or more request signals respectively as a grant signal from the ready demodulators to a first ready demodulator, first in the second enumerated order, processing the data signal by the first ready demodulator, and moving the first ready demodulator from the set of ready demodulators to the set of busy demodulators, wherein k is an integer greater than one, m is an integer greater than zero and less than or equal to k, n is an integer less than or equal to k, and m plus n equals k.

The step of sending a grant signal to the first ready demodulator may be carried out by sending the grant signal through all of the n busy demodulators that are higher in the first enumerated order than the first ready demodulator.

A method is also provided for receiving and processing burst-mode code-division multiple access (CDMA) direct-sequence spread-spectrum (DSSS) signals, the method comprising the steps of receiving a signal at first through $k^{th}$ demodulators, the first through $k^{th}$ demodulators being set in a first enumerated order and divided into a set of m ready demodulators and a set of n busy demodulators, the ready demodulators being set in a second enumerated order analogous to their order in the first enumerated order, detecting a preamble in the signal at the ready demodulators, sending one or more request signals respectively from the ready demodulators to an arbitrator, sending a grant signal from the arbitrator to a first ready demodulator, first in the second enumerated order, processing the signal by the first ready demodulator, and moving the first ready demodulator from the set of ready demodulators to the set of busy demodulators, wherein k is an integer greater than one, m is an integer greater than zero and less than or equal to k, n is an integer less than or equal to k, and m plus n equals k.

The step of sending a grant signal from the arbitrator to a first ready demodulator may be carried out by sending the grant signal through all of the n busy demodulators that are higher in the first enumerated order than the first ready demodulator.

A signal receiving and demodulating system is provided, comprising first through $k^{th}$ demodulators, arranged in an enumerated order, each having an IF signal input for receiving an IF signal, an $i^{th}$ request signal output, an $i^{th}$ busy signal output, an $i^{th}$ grant signal input, and an $i^{th}$ grant signal output, wherein each of the first through $k^{th}$ demodulators are in either a busy state in which they provide the $i^{th}$ busy signal from the $i^{th}$ busy signal output, or are in a ready state, wherein all ready-state demodulators provide the $i^{th}$ request signal at the $i^{th}$ request signal output upon detecting a preamble in the IF signal, wherein the highest ready-state demodulator in the enumerated order receives the $i^{th}$ grant signal at the $i^{th}$ grant signal input, provides no signal at the $i^{th}$ grant signal output, and is moved into a busy-state to process the IF signal, wherein all of the busy-state demodulators of a higher enumerated order than the highest-ordered ready-state demodulator receive the $i^{th}$ grant signal at the $i^{th}$ grant signal input and provide the $i^{th}$ grant signal at the $i^{th}$ grant signal output, and wherein k is an integer greater than 1 and i is an integer that varies between 1 and k, but remains constant for each of the first through $k^{th}$ demodulators.

The signal receiving and demodulating system may also comprise an arbitrator having k request signal inputs for receiving the first through $k^{th}$ request signals, k busy signal inputs for receiving the first through $k^{th}$ busy signals, and k grant signal outputs for providing signals in response to at least one of the first through $k^{th}$ request signals.

A local arbitration circuit in a demodulator is also provided, comprising a peak-and-threshold detector for providing a preamble detection signal when the demodulator is in a ready state, and the peak-and-threshold detector detects a preamble in an incoming IF signal, a first gate for providing a request signal in response to the preamble detection signal when the demodulator is in the ready state, a second gate for receiving a grant input signal and providing a grant output signal when the demodulator is in a busy state, a busy signal generator for providing a busy signal when the demodulator is in the busy state, a switching circuit for changing the demodulator to the busy state when it receives the preamble detection signal and the grant-in signal, and for changing the demodulator into a ready state when it receives an end-of-burst signal indicating that the incoming IF signal is completely demodulated.

BRIEF DESCRIPTION OF THE DRAWINGS

The above and other objects and advantages of the present invention will become readily apparent from the description that follows, with reference to the accompanying drawings, in which.

DESCRIPTION OF THE PREFERRED EMBODIMENTS

Figure 1:
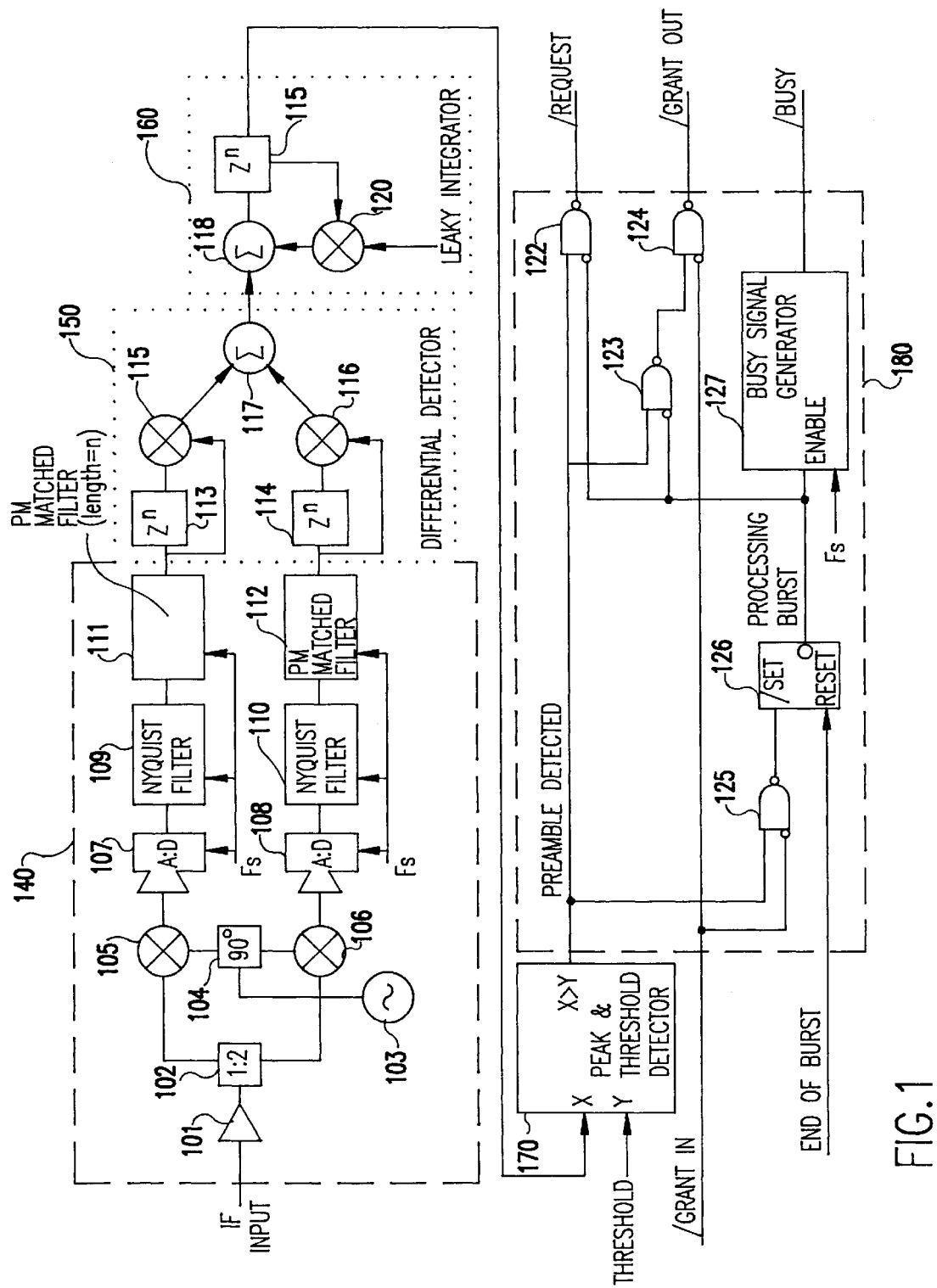
FIG. 1 is a block diagram of a demodulator circuit, including preamble detection and arbitration circuits, according to a preferred embodiment of the present invention.

The present invention employs a novel arbitration mechanism, closely coupled with a preamble detection circuit to solve the problems noted above.

The Turbosat system is an asynchronous CDMA transmission system using a pool of codes shared by a larger number of VSATs. The number of spreading sequences used can vary from a minimum of one up to the number of codes that can be found for a given spreading factor that have desirable aperiodic cross-correlation properties.

In the Turbosat system, several transmitters share a common spreading sequence or a set spreading sequences from which they choose at random. Typically, all stations transmit on a common radio frequency. The signals from the transmitters can all be at a single data rate, or a few power-of-two multiples of a single data rate. They can all be generated using spreading sequences $2^n$ chips long, where n can range from a minimum of 3 up to 7 or more. All of the signals at the same data rate can have the same spreading factor, i.e. the same number of of chips per symbol.

Since there is no attempt to precisely synchronize the timing of the transmissions as received by the receiver/demodulator systems down to the chip or sub-chip level, as would be the case in an orthogonal or quasi-orthogonal CDMA system, the symbol boundary of one signal can be separated from the symbol boundary of another signal by up to plus or minus one half of a symbol. The symbol boundary ordinarily corresponds to a spreading sequence epoch.

Each burst transmission begins with a preamble. The preamble consists of a first part which is modulated with the spreading sequence but with no data, and a second part which is a unique data word (a bit pattern used for burst synchronization) modulated with the spreading sequence.

A pool of demodulator channels is employed to process multiple overlapping CDMA signals using the same or different spreading sequences and the same data rate or powers-of-two multiples of a common data rate. The spreading sequences that are used on the same frequency at the same time can be chosen such that their out-of-phase auto-correlation and cross-correlation values are minimal. Auto-correlation and cross-correlation are defined and discussed on pages 71–79 of the book *Spread Spectrum Systems Second Edition*, by Robert C. Dixon, published by Wiley Interscience, the teachings of which are incorporated herein by reference.

Since each demodulator channel configured to receive a particular spreading sequence and data rate may detect the same received signal, all such demodulator channels could begin processing the same inbound burst. Subsequent overlapping inbound bursts using the same spreading sequence and data rate could then be ignored, and their data lost. If the demodulator channels were all to forward the data they demodulate to a common processor, the processor could be burdened with many duplicates of the same message. To avoid these problems, a design is required that assigns an individual demodulator channel to each received burst signal, while permitting the other demodulator channels in the same pool to continue searching for subsequent signals.

A design intended to avoid these problems uses a pool of demodulator channel circuits each containing a preamble detection circuit, coupled to arbitration circuits located in the same chassis as the demodulator channel circuits.

The demodulator channel circuits are designed so that one demodulator channel preamble detection circuit can simultaneously process multiple received signals; several demodulator channels may simultaneously detect the same received signal; or several demodulator channels may detect the same received signal but on different symbols (spreading sequence frames) within the first part of the preamble. The latter condition is due at least in part to the fact that there can be minor differences in the power levels of the received signals received by different demodulator channels. This is due to minor differences in the path losses experienced by the received signal as it propagates through different IF splitter paths to the various demodulator channels within a chassis.

There are several economic, efficiency, and flexibility requirements for the demodulator channel chassis that lead to requirements for the arbitration circuit. First, one demodulator chassis should be capable of processing inbound bursts with several different spreading sequences. Also, only the demodulator channels contained in one chassis will ordinarily be assigned to a particular spreading sequence. Finally, there can be many (more than 20) demodulator channels in a single chassis.

Another requirement has to do with the time spacing between the symbol boundaries of received inbound signals. Suppose two inbound signals are being received at the same time. If their symbol boundaries are within plus or minus one chip of each other, this is considered a collision, and the system need not correctly receive either one of them. If two inbound signals are received with their symbol boundaries spaced at least two chips apart, the system should receive both of them correctly (assuming both meet all other criteria for successful reception). Between plus or minus one and plus or minus two chips of separation is an area of uncertainty, and it is a design goal that the system will be able to correctly receive inbound signals whose symbol boundaries are separated by at least one chip.

The preamble detection circuit is a digital circuit operating on a sampled analog signal at a rate of two samples per spreading sequence chip interval. (More samples per chip interval could be used, but two is the minimum required, since the preamble detection circuit operates prior to PN synchronization.) The indication that a demodulator preamble detection circuit has detected an inbound preamble comes in the form of a PREAMBLE DETECTED signal output. This signal could be in the form of a short pulse, or in the form of a level change. The demodulator expects a signal back from the arbitration circuit to instruct it to continue processing the burst. This signal could also be in the form of a short pulse or a level change. In the preferred embodiments below, both of these signals are in the form of a short pulse. However, a level change can be used in alternate embodiments, and any necessary accommodations in the demodulator channel circuits can be made by one skilled in the art.

When the preamble detection circuit in a given demodulator channel detects a preamble, it will send a "request" pulse to the arbitration circuits. If the arbitration circuit sends a "grant" pulse back, that demodulator channel will continue processing the inbound signal it has detected by looking for a unique word that forms the second part of the preamble. A mechanism is preferably provided in the demodulator channel to clear the arbitration request if no unique word is found within a certain number of preamble symbols. If the arbitration circuit does not send a "grant" pulse back, the demodulator channel should continue looking for other preambles.

If all demodulator channels within a single chassis that are assigned to detect inbound transmissions with a given spreading sequence are guaranteed to detect a particular inbound burst at the nearly the same instant (by detecting the end of the unique word, for example), then the arbitration mechanism can be very simple: send a "grant" signal back to the demodulator channel whose "request" signal is received first.

However, if the burst detection mechanism is such that the preamble can be detected before the end of the unique word, a more complex design is required. In the preferred embodiment, the preamble detector can detect the preamble before the beginning of the unique word. The preamble detector will only fire on the chip at a symbol boundary, or spreading sequence epoch, due to the way the preamble detector circuit operates. However, the preamble detectors in different demodulator channels may fire on different symbol boundaries, due to the minor level differences on the IF signals distributed to the demodulator circuit boards, and due to possible differences in the threshold levels set on the input to the peak-and-threshold detection circuits in different demodulator channels. This means that the arbitration mechanism must keep track of the time at which a preamble has already been detected, in order to avoid sending a "grant" in response to a detection on a subsequent symbol boundary of the same inbound preamble.

The arbitration timekeeping mechanism can operate at an arbitrary phase with respect to the randomly-timed inbound signal symbol boundaries. It must go through one complete cycle every symbol period. It must keep track of time within a symbol period down to at least the one-chip level. Since the preamble detector is operating with a sampling rate of two samples per chip, some preamble detectors may fire one-half chip (one sample) before or after other preamble detectors fire, on the same preamble. In fact, some preamble detectors may fire one or more symbols plus or minus one-half chip after the first preamble detector fires on a given preamble. Occasionally, a preamble detector may fire as much as one full chip early or late with respect to the symbol boundary on a given preamble, especially when a collision or near-collision is occurring. Because of these facts, the timekeeping mechanism in the arbitration circuit should operate with a resolution equal to the sampling interval, or the half-chip level.

Under ideal conditions, the preamble detectors in all of the demodulator channels would always fire at the same instant on the same inbound signal preamble. It would then be possible to make a single entry in the arbitration circuit timekeeping memory to indicate that a particular spreading sequence epoch is in use. This entry would indicate that a grant has been issued for that particular spreading sequence epoch, and no fuirther grants should be issued. As mentioned above, however, the preamble detectors can fire at different sample and symbol times on the same preamble. Therefore, it is necessary to deal with the situation in which several preamble detectors fire on different samples of the same preamble. Again, it is fairly likely that when the demodulator channel samples at equally-spaced intervals on either side of the autocorrelation peak of an inbound signal, some preamble detectors will fire on the left (earlier) side of the peak, while others will fire on the right (later) side of the peak.

To handle this situation, one embodiment of the present invention makes three entries in an arbitration circuit timekeeping buffer: one before, one in, and one after the sample slot in which the request was received. These entries are made when the first request is received for the particular burst and the grant is issued.

Figure 8:
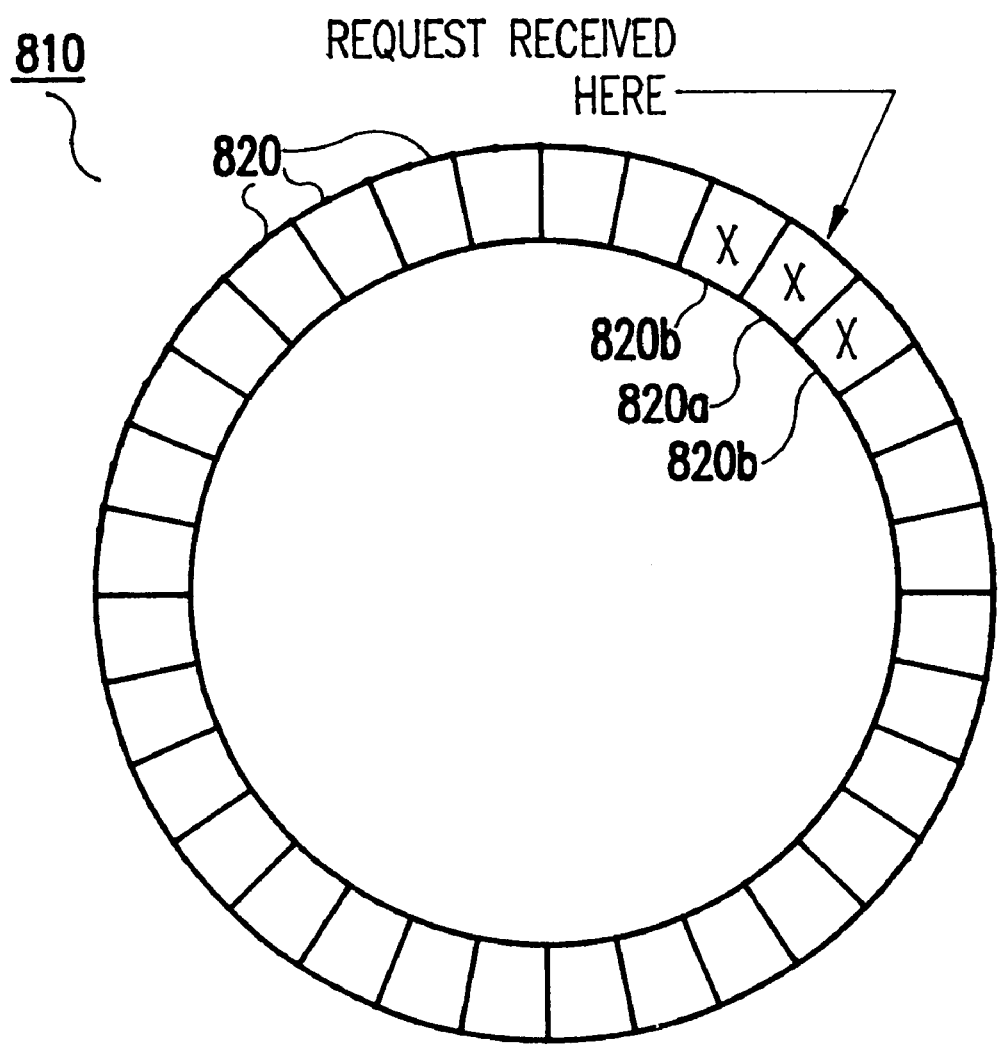
FIG. 8 is an illustration of the marking of the timing wheel data structure for one request.
Figure 9:
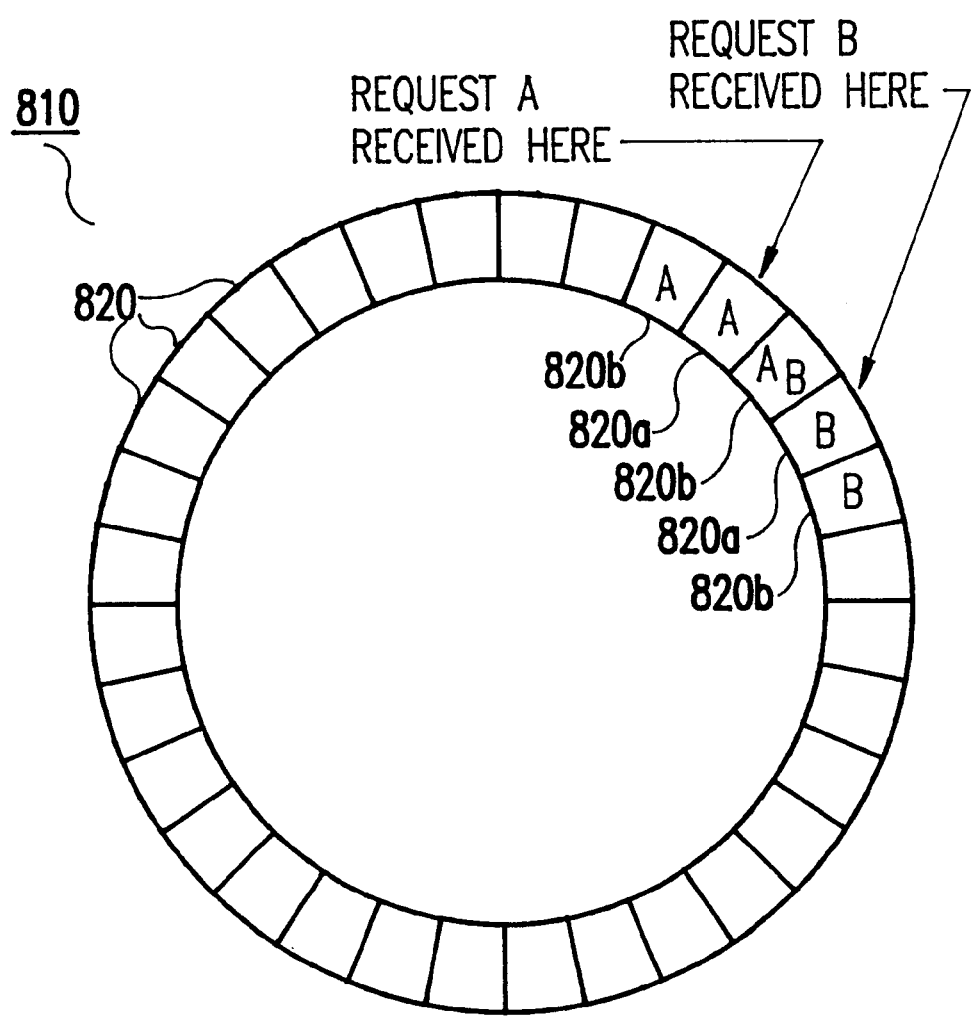
FIG. 9 is an illustration of the marking the timing wheel data structure shown in FIG. 1 for two requests.

FIGS. 8 and 9 are illustrations of the marking of the data structure for one and two requests, respectively. As shown in FIGS. 8 and 9, an arbitration circuit timekeeping memory 810 includes a plurality of memory slots 820 looped around in a circle. In the embodiments of this invention that use an arbitration circuit, the number of memory slots 820 is preferably equal to twice the spreading factor. For example, the systems associate with the timekeeping memories 810 shown in FIGS. 8 and 9 have a spreading factor of 16, so they have 32 memory slots 820.

When a request comes in, the arbitration circuit will first examine the timekeeping memory slot 820 corresponding to the time at which the request is received. This slot is called the on-time slot 820a, and has two adjacent slots 820b, one on either side. If the on-time slot 820a is not marked, indicating no other request was granted for that slot or a slot immediately adjacent to it, the arbitration circuit will issue a grant. Otherwise, no grant will be issued. If the demodulator channel does not receive a grant within one chip period, it will continue looking for other preambles. When an on-time slot 820a is assigned, the circuit marks the on-time slot 820a and the adjacent slots 820b, as described below.

When the demodulator channel assigned to process an inbound signal finishes its processing of that signal, the arbitration circuit needs to be informed that the open slots can be made available for another inbound signal. The demodulator channel must send a signal to the arbitration circuit to accomplish this. This signal can be designated the "free" signal. The demodulator channel must issue the "free" signal in the same time slot as it issued the "request" signal in for the arbitration circuit to know exactly which time slot is being made available.

If two requests A and B are received two samples apart, the timekeeping memory will be marked twice in the slot between the two slots corresponding to the arrival time of the two requests.

When either demodulator channel processing one of the two inbound signals that resulted in the "request" signals finishes, it will send a "free" signal to the arbitration circuit. The arbitration circuit will then clear the markers in the three memory slots 820 corresponding to the on-time slot 820a in which the request was received and the two adjacent slots 820b.

This leaves one problem, however. If only one bit were used to mark the adjacent slots 820, this would result in the slot that was marked in response to the requests by both of the demodulator channels being erroneously marked as being available after only one "free" signal.

A two-bit timekeeping memory slot entry can be used to correct this problem. The timekeeping memory 810 has three different markings that can be placed in a buffer slot: a single marking, a double marking, and a free marking. A single marking indicates that the buffer is being occupied by a single request, and corresponds to $01_2$ in the preferred embodiment. The double marking indicates that the buffer is being occupied by two requests, i.e., is adjacent to two on-time slots 820a, and corresponds to $10_2$ in the preferred embodiment. The free marking indicates that the buffer slot 820 is not being occupied by any request, and corresponds to $00_2$ in the preferred embodiment.

Before marking a slot 820, the arbitration circuit must first examine the contents of the slot 820 to see if it has already been marked. When a request is received, if the on-time slot 820a (the slot corresponding to the time at which the request is received) is marked with the free mark ($00_2$), the arbitration circuit marks the on-time slot 820a with a first marking ($01_2$) and issues a grant.

The arbitration circuit then examines the two buffer slots 820b adjacent to the on-time slot 820a. If the adjacent slot 820b is marked with the free marking ($00_2$), the arbitration circuit marks the adjacent slot 820b with the single marking ($01_2$). If the adjacent slot 820b has been marked with the single marking ($01_2$), the arbitration circuit marks the adjacent slot 820b it with a double marking ($10_2$).

When a "free" signal is received at an on-time slot 820a, the arbitration circuit marks the on-time slot 820a with a free marking ($00_2$), and then examines the two adjacent slots 820b. If an adjacent slot 820b is marked with the double marking ($10_2$), indicating that it is occupied by two requests, the arbitration circuit changes its marking to the single marking ($01_2$), thus indicating that it is now only occupied by a single request. If an adjacent slot 820b is marked with the single marking ($01_2$), indicating that it is occupied by only a single request, the arbitration circuit changes the marking to the free marking ($00_2$), indicating that it is now free.

A condition can also occur in which one preamble detector fires one sample early and another fires one sample late. (The early detector could fire on a symbol that is subsequent to the one on which the late detector fires, to further complicate matters.) This is only likely to happen in the case of noise that severely distorts the autocorrelation peak. When this occurs, the arbitration circuit will receive two requests and issue two grants. So two demodulator channels will process the same inbound signal. The central message processor software can be made to detect this and eliminate the duplicate message.

The arbitration circuit described above has several potential failure mechanisms that could adversely affect the system performance. One possible failure mechanism is the one in which the demodulator channel fails to issue the "free" signal when it has finished processing the burst, for some reason. This will leave the timekeeping buffer marked in those slots assigned when the "request" signal from the demodulator channel was received. This in turn will block any other requests in these time slots. Thus no transmitter will be able to successfully transmit in those time slots.

To solve this problem, some kind of watchdog timer mechanism is implemented so that a "free" signal would be generated after the maximum burst length. If this watchdog timer mechanism is implemented within the arbitration circuit, it must be independent for each burst processed. Thus, one way to implement the watchdog timer is to incorporate a counter value within the timekeeping wheel mechanism. This results in a large word width for the timekeeping wheel mechanism, and adjusts the associated cost accordingly.

Rather than having the arbitration mechanism be centralized, however, it can be distributed, and reside within the circuits of each demodulator channel. This kind of distributed arbitration mechanism is the preferred embodiment of the present invention. The indication that a particular spreading sequence phase is already being demodulated can be broadcast from the demodulator channel demodulating the burst to the other demodulator channels within the chassis using a "busy" signal. When a demodulator channel detects a burst, it will first check the "busy" signal for its assigned arbitration circuit level.

If the "busy" signal is not asserted, the demodulator channel will assert a "request" signal. The "request" signal will be echoed from the end of the chassis closest to a first slot in the chassis (the left-most slot as viewed from the front of the chassis, in the preferred embodiment) as a "grant" signal on the same arbitration circuit level. If the demodulator channel that issued the "request" receives the "grant," it will then assert the "busy" signal for the half-chip intervals immediately preceding, during, and immediately after the one in which it found the burst, for every symbol, until it detects an error condition or until it detects that the end of the burst has occurred. If the demodulator channel that issued the "request" does not receive a "grant," it will continue looking for other bursts.

FIG. 1 is a block diagram of the preamble detection and arbitration circuits according to a preferred embodiment of the present invention. This preferred embodiment comprises I and Q channel matched filters 140, a differential detector 150, a "leaky integrator" 160, a peak-and-threshold detector 170, and a local arbitration circuit 180. The I and Q channel matched filters 140, further comprises a gain stage 101, a 1:2 power divider 102, a local oscillator 103, a quadrature power divider 104, first and second mixers 105 and 106, first and second analog-to-digital (A/D) converters 107 and 108, first and second Nyquist filters 109 and 110, and first and second pseudo-noise (PN) matched filters 111 and 112. The differential detector 150 further comprises first and second one-symbol delays 113 and 114, first and second multipliers 115 and 116, and a first summer 117. The leaky integrator 160 further comprises a second summer 118, a delay 119, and a third multiplier 120. The local arbitration circuit 180 further comprises first through fourth gates 122, 123, 124, and 125, a latch 126, and a busy signal generator circuit 127.

The I and Q channel matched filters 140 are matched to the particular spreading sequence to which the demodulator channel is assigned. The leaky integrator 160 integrates the output of the matched filter 140 and differential detector 150 over a number of preamble symbols.

As shown in FIG. 1, the operation of the I and Q channel matched filters 140 is as follows. The intermediate frequency (IF) signal is amplified by the gain stage 101, whose output is coupled to the 1:2 power divider 102. The outputs of the power divider 102 are in turn coupled to the RF inputs of the first and second mixers 105 and 106, which are also fed at the IF frequency by the in-phase and quadrature components of the local oscillator 103 via the quadrature power divider 104. The outputs of the mixers 105 and 106 are preferably baseband I and Q signals. These signals are digitized by the first and second A/D converters 107 and 108 at two samples per chip. The digitized I and Q symbols are then filtered by the first and second Nyquist filters 109 and 110 to remove noise. The filtered I and Q symbols are then coupled to the first and second PN matched filters 111 and 112, which are matched filter correlators programmed with a reference sequence corresponding to the PN code that the demodulator channel is intended to recognize. The outputs of the PN matched filters 111 and 112 are then coupled to the differential detector circuit 150, wherein differential detection of the I and Q outputs of the PN matched filters is performed.

The outputs of the of the first and second PN matched filters 111 and 112 are provided respectively to the first and second one-symbol delays 113 and 114 in the differential detector 150. The first and second one-symbol delays 113 and 114 in turn supply signals to the first and second multipliers 115 and 116, whose outputs are then combined in the first summer 117. When the desired signal is present, the signal that results at the output of the first summer 117 is a series of numerical values, two each chip, whose magnitude is at a maximum when the received PN sequence is aligned with the reference sequence in the PN matched filters 111 and 112.

These numerical values output from the first summer 117 are then integrated by the leaky integrator circuit 160. The "leakiness" of the leaky integrator 160 is provided by making the constant input to the third multiplier 120 a number slightly less than one. This allows the leaky integrator 160 output to decay over time after having accumulated a large positive or negative value.

The delay provided by the delay element 119 is equal to the number of A/D converter samples in one complete repetition of the PN sequence. For example, if the PN sequence is 32 chips long, and the number of A/D samples per chip is two, the delay will be 64 samples in length. Also, the constant input to the third multiplier 120 is chosen in accordance with the number of symbols in the preamble allocated for detection. If 64 symbols are allocated, the constant is typically chosen to be $63/64$ or $31/32$. The output of the leaky integrator circuit 160 will be a series of values, two each chip, that build in magnitude when the desired signal is present.

When the output values from the leaky integrator 160 reach a threshold magnitude, they are detected by peak and threshold detector 170, which issues a "PREAMBLE DETECTED" pulse in response. If the demodulator channel is free, i.e., not currently processing a burst, this pulse is output as a /REQUEST signal on a bus to the other demodulators 210, 215, 220 (to the arbitrator 305/405 in the alternate embodiments) via the first gate 122 in the local arbitration circuit 180. In response to this /REQUEST signal, the other demodulators 210, 215, 220 (the arbitrator 305/405 in the alternate embodiments) send back a /GRANT IN signal. The /REQUEST signal will not be output if the /BUSY signal is active (i.e., low).

If this demodulator channel is asserting a /REQUEST signal when the /GRANT IN signal is received, i.e., if the PREAMBLE DETECTED signal is high, the fourth gate 125 asserts its output and sets latch 126. The latch 126 then outputs the PROCESSING BURST signal to the first gate 122, the second gate 123, and the busy signal generator circuit 127. The PROCESSING BURST signal prevents the first gate 122 from outputting any further /REQUEST signals, and enables the busy signal generator circuit 127 to assert a /BUSY signal once each symbol at the time of the PN epoch that resulted in the request from this arbitrator. If the PROCESSING BURST signal is low and the PREAMBLE DETECTED signal is high when a /GRANT IN signal is received, the top input to the third gate 124 will be low, preventing /GRANT OUT signals from being output by the third gate 124. The PROCESSING BURST signal remains high until the demodulator channel finishes processing the burst and receives the END OF BURST signal, which resets the latch 126.

If a /GRANT IN signal is received while the demodulator channel is processing a burst, i.e., the PROCESSING BURST signal is active (high), the output of the second gate 123 will be high, permitting the /GRANT IN signal to pass through the third gate 124 and become a /GRANT OUT signal.

Figure 2:
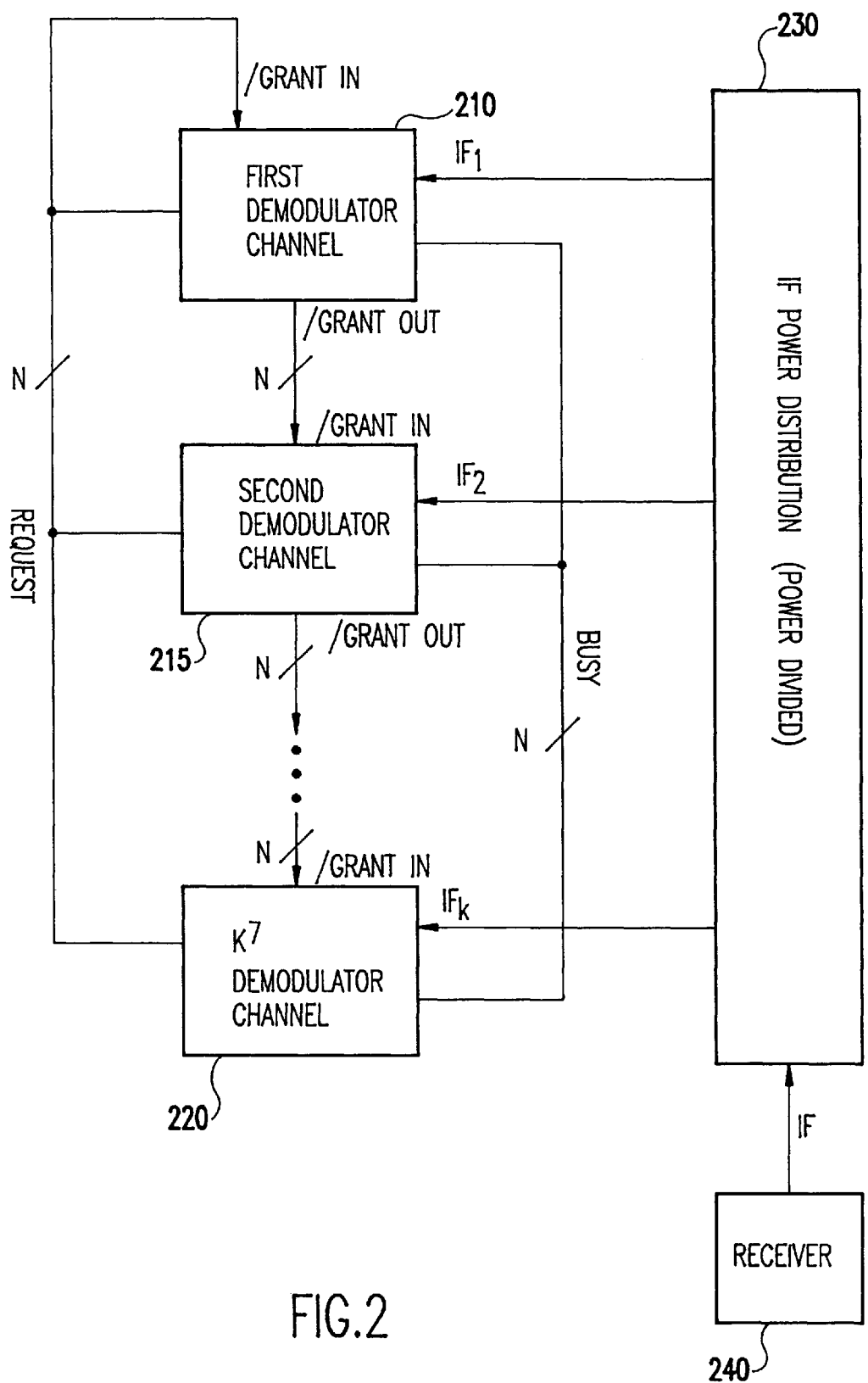
FIG. 2 is a block diagram showing the connection of k demodulator circuits according to a preferred embodiment of the present invention.

FIG. 2 is a block diagram showing the connection of n demodulator circuits according to a preferred embodiment of the present invention. As shown in FIG. 2, each of the first through $k^{th}$ demodulators 210, 215, 220 are connected via an IF power distribution circuit 230 to a receiver 240. The first through $k^{th}$ demodulators 210, 215, 220 each receive a /REQUEST signal and a /BUSY signal from each of the other demodulators 210, 215, 220. The first demodulator 210 provides a /GRANT signal to the second demodulator 215, which in turn passes the /GRANT signal on, through each intermediate demodulator, to the $k^{th}$ demodulator 220, as described below. The /REQUEST signal is looped back to the first demodulator channel 210 to serve as its received /GRANT IN signal.

Figure 3:
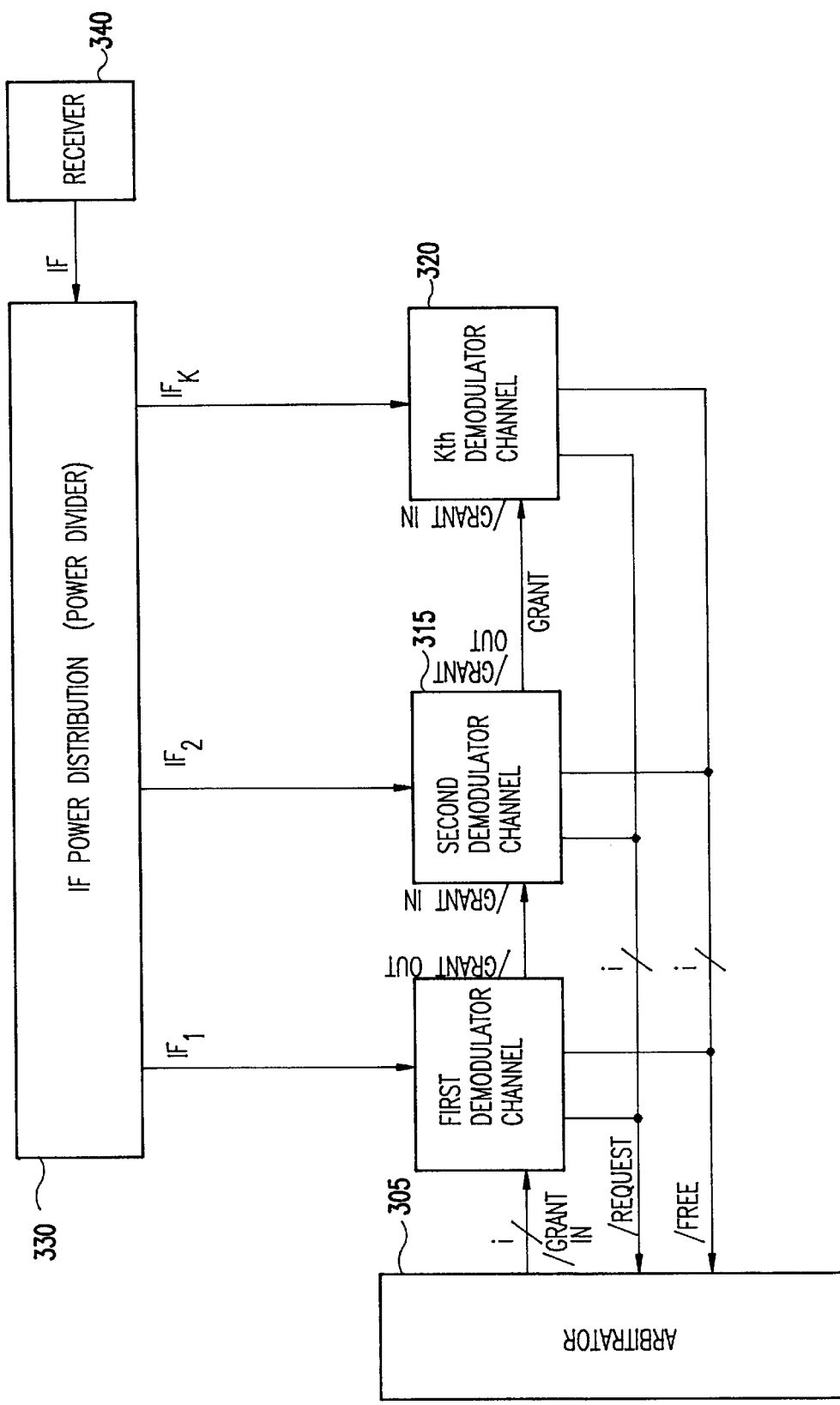
FIG. 3 is a block diagram showing the connection of k demodulator circuits to an arbitrator according to a first alternate preferred embodiment of the present invention.

In an alternate embodiment, however, a separate arbitrator can be used to route the /REQUEST and /GRANT signals, thus centralizing the timing of the circuit. A /FREE signal from the demodulator circuits is used to signal to the arbitrator that a demodulator has finished processing an inbound burst message. FIG. 3 is a block diagram showing the connection of k demodulator circuits to an arbitrator according to a first alternate preferred embodiment of the present invention. As shown in FIG. 3, each of the first through $k^{th}$ demodulators 310, 315, 320 are connected via an IF power distribution circuit 330 to a receiver 340. An arbitrator 305 receives a /REQUEST signal and a /FREE signal from each of first, second, through $k^{th}$ demodulator 310, 315, 320, and provides a /GRANT signal to the first demodulator 310. The first demodulator 310 then provides a /GRANT signal to the second demodulator 315, which in turn passes the /GRANT signal on, through each intermediate demodulator, to the $k^{th}$ demodulator 320, as described below.

Figure 4:
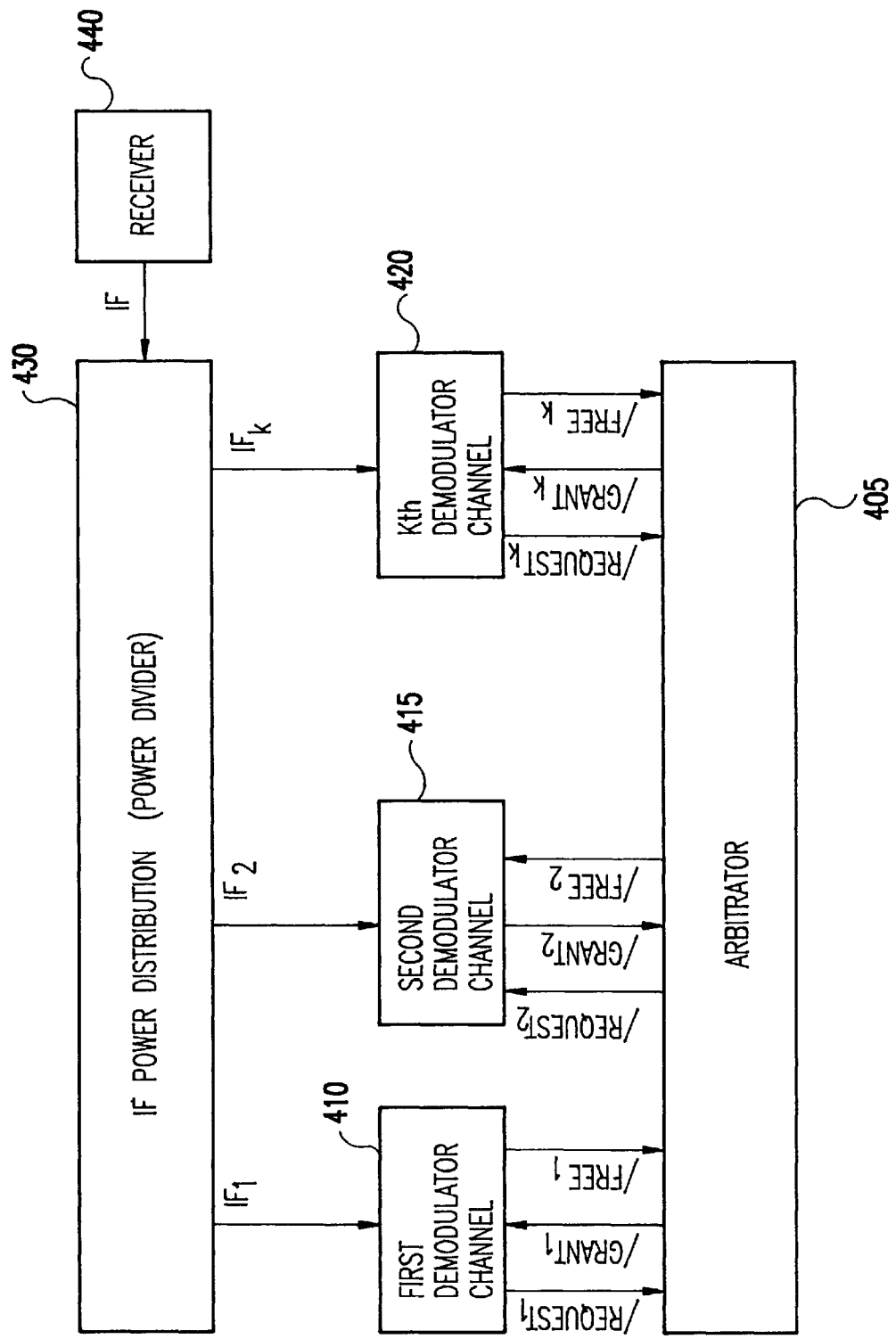
FIG. 4 is a block diagram showing the connection of k demodulator circuits to an arbitrator according to a second alternate preferred embodiment of the present invention.

In another alternate embodiment, however, a separate arbitrator can be used to route the /REQUEST, /FREE, and /GRANT signals, again centralizing the timing of the circuit. FIG. 4 is a block diagram showing the connection of k demodulator circuits to an arbitrator according to a second alternate preferred embodiment of the present invention. As shown in FIG. 4, each of the first through $k^{th}$ demodulators 410, 415, 420 are connected via an IF power distribution circuit 430 to a receiver 440. An arbitrator 405 receives a /REQUEST signal and a /FREE signal from each of first, second, through $k^{th}$ demodulator 410, 415, 420, and provides a /GRANT signal to each of the demodulators 410, 415, 420.

Figure 5:
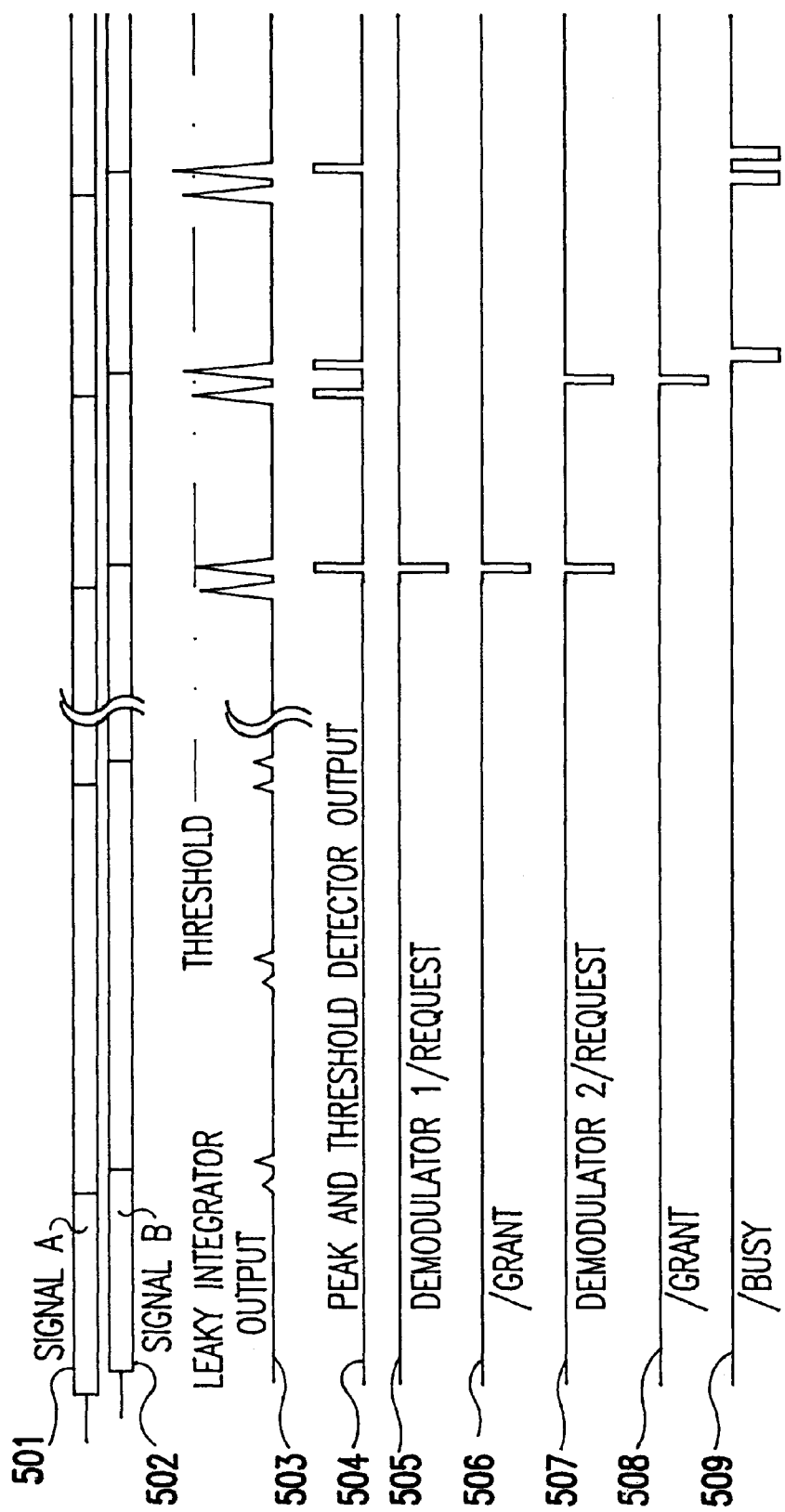
FIG. 5 is a timing diagram illustrating the operation of the demodulator circuits and arbitrator of FIGS. 1 and 2 according to a preferred embodiment of the present invention.
Figure 6:
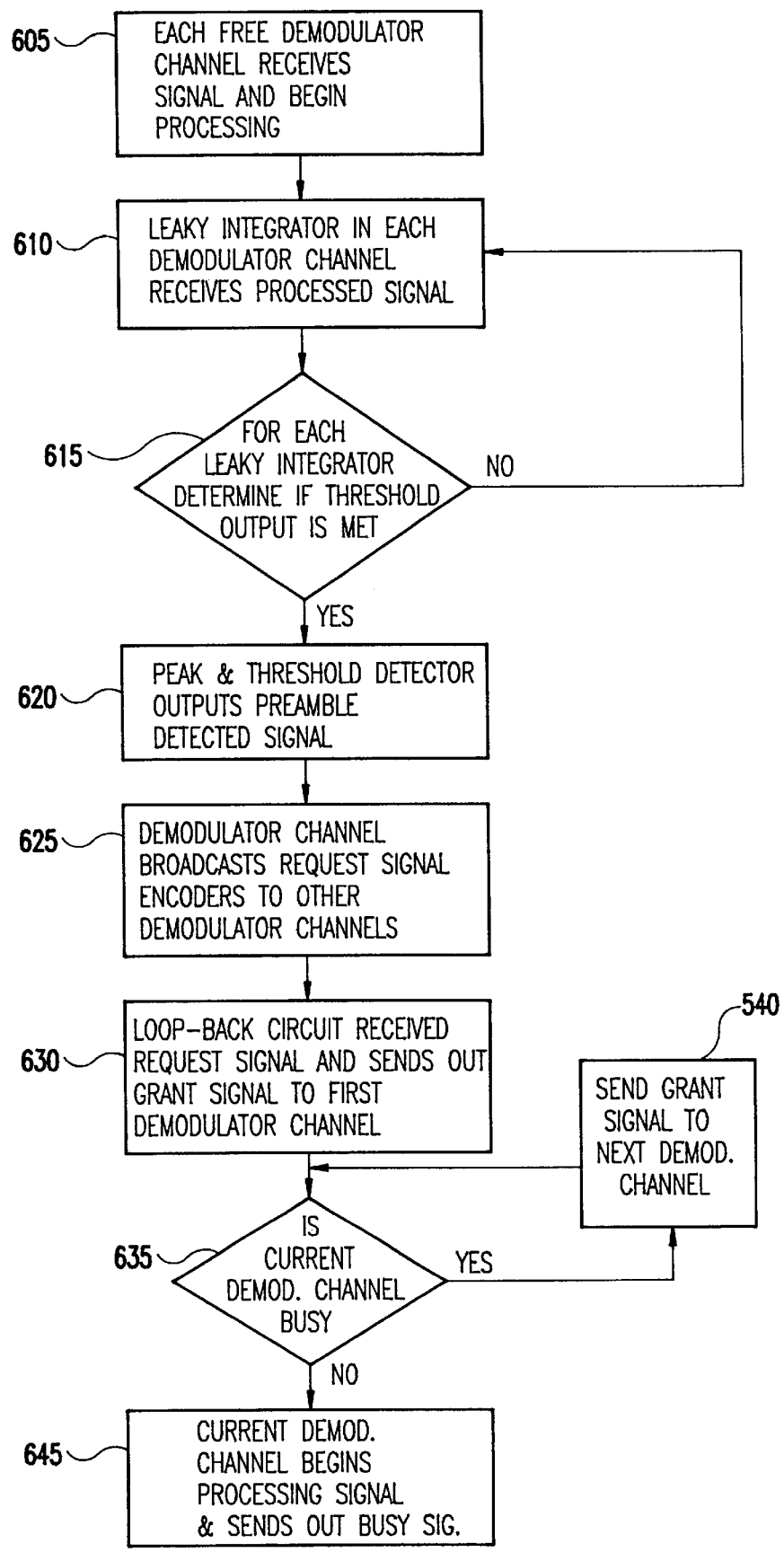
FIG. 6 is a flow chart illustrating the operation of the demodulator circuits and arbitrator of FIGS. 1 and 2 according to a preferred embodiment of the present invention.

The operation of the preferred embodiment, as shown in FIGS. 1 and 2 is circuit is further illustrated in FIGS. 5 and 6. FIG. 5 is a timing diagram illustrating the operation of the demodulator circuits and arbitrator of FIGS. 1 and 2 according to a preferred embodiment of the present invention. FIG. 6 is a flow chart illustrating the operation of the demodulator circuits and arbitrator of FIGS. 1 and 2 according to a preferred embodiment of the present invention.

In particular, FIG. 5 illustrates the operation of two demodulators on first and second received signals 501 (signal A) and 502 (signal B) having the same symbol rate and the same PN code. In this example, the symbol boundary of the second received signal 502 is delayed about three chips with respect to the symbol boundary of the first received signal 501. The first and second demodulators will receive the first signal 501 (signal A), and will process it through the respective I and Q channel matched filters 140 and differential detectors 150 (Step 605). Their leaky integrators 160 will then receive the output of the differential detector 150 (Step 610).

The output of the leaky integrator delay element 119 in each demodulator, illustrated for clarity as an analog voltage corresponding to the numerical value output by leaky integrator delay element 11 9, will resemble waveform 503. This output signal is supplied to a respective peak-and-threshold detector 170 in each demodulator, which detector determines whether its peak magnitude has reached or exceeded a predetermined threshold level (Step 615). When the peak magnitude of signal 503 exceeds the threshold level set at the input of each peak-and-threshold detector 170, a PREAMBLE DETECTED pulse will occur at the output signal 504 of the peak-and-threshold detector 170 (Step 620).

Assuming that both demodulators have the same threshold setting and that the IF signal levels into the two channels are identical, both demodulators will detect the first threshold crossing of signal 503 responsive to the first received signal 501 (signal A) and generate first and second /REQUEST signals 505 and 507 from the first gates 122 associated with each demodulator (Step 625). These /REQUEST signals are looped back and serve as the /GRANT IN signal for the first demodulator 210 (Step 630). The PREAMBLE DETECTED pulses in the output signal 504 are asserted on the inputs of each demodulator's second gate 123 and serve to prevent both channels from passing the corresponding /GRANT signal 506.

Assuming the first demodulator (210 from FIG. 2) is closer to the first slot in the chassis than the second demodulator (215 from FIG. 2) is, the first demodulator 210 will receive the /GRANT IN signal first, and the circuit will determine if the current, i.e., first, demodulator channel is busy (Step 635). If, as in this case, the first demodulator 210 is free, the PREAMBLE DETECTED signal, passed through the second gate 123, will then disable the third gate 124 in the first demodulator 210 and prevent it from passing the /GRANT IN signal as a /GRANT OUT signal to the second demodulator 215. At this point the first demodulator 210 will begin processing the signal (Step 645).

The /GRANT signal and the PREAMBLE DETECTED signal will set the latch 126 in the first demodulator 210. The output of the set latch 126 will disable the first gate 122 from sending out /REQUEST signals, and will cause the busy signal generator 127 to output a /BUSY signal once each symbol at the time of the PN epoch that resulted in the request from this arbitrator. This will continue until the latch 126 is reset upon receipt of information indicating an end to the burst the first demodulator 210 is processing.

If, however, the first demodulator 210 were busy processing a signal already, the PROCESSING BURST signal in the first demodulator 210 would remain high, the output of the second gate 123 will therefore be low, and the third gate 124 will pass the /GRANT IN signal to the second demodulator 215 as a /GRANT OUT signal (Step 640). This will allow the second demodulator 215 to process the signal, and allow it to refrain from passing the /GRANT signal on to the next demodulator in the line.

During processing, busy demodulators, i.e., those processing signals and outputting /BUSY signals, can continue to detect preambles. However, they only process the signal associated with the preamble for which they issued a /REQUEST and received a /GRANT.

In the meanwhile, as the first demodulator 210 is processing a signal, the second demodulator 215 will continue to receive incoming signals, including the second received signal 502 (signal B). When the peak value of the leaky integrator output 503 corresponding to the second received signal 502 (signal B) crosses the predetermined threshold, the second demodulator 215 will output a /REQUEST signal 507 responsive to the second received signal 502 (signal B), and will itself receive a /GRANT signal 508.

The /GRANT signal 508 will actually pass through the first demodulator 210. But, as noted above, since the first demodulator 210 is busy processing signal A, the PROCESSING BURST signal in the first demodulator 210 will remain high, so the output of the second gate 123 will be high, and so the output of the third gate 124 in the first demodulator 210 will simply pass the /GRANT signal along to the next demodulator in the line, the second demodulator in this case.

During this time, the first demodulator 210 will not output a /REQUEST signal responsive to the second received signal 502 (signal B) since it is busy processing the first received signal 501 (signal A). As noted above, the first gate 122 in the first demodulator 210 is disabled from outputting a /REQUEST signal by the PROCESSING BURST signal from the latch 126 in the first demodulator 210.

Once the second demodulator receives the /GRANT signal, it too will assert a /BUSY signal via its own busy signal generator 127. Thus, both demodulators begin asserting the /BUSY signal 509 one symbol after receiving a /GRANT signal. This will prevent any other demodulator channels that detect either signal A or signal B from generating a /REQUEST signal in response. Once the first and second demodulators 210 and 215 complete processing the first and second received signals 501 and 502 (signals A and B), respectively, their latches 126 will be reset, and they will again receive the IF input and will return to the state of ready demodulators.

Since there can be several different spreading sequences assigned to one demodulator chassis for processing, there need to be several arbitration circuits in one chassis. There may also be several different spreading factors processed within one chassis. Therefore, the chassis must provide for several "request" signal lines, an equal number of "busy" signal lines, and an equal number of "grant" signal lines.

In this preferred embodiment, the demodulator chassis is a VME (IEEE 1014) chassis. The demodulator circuit boards are preferably 6U VME boards, with two connectors, P1 and P2, each preferably having 96 pins. There are preferably two demodulator circuits per demodulator circuit board. As dictated by the IEEE 1014 standard, all of the first connector P1 and the center row (row B) of the second connector P2 are mostly dedicated VME bus signal lines and power. The outer two rows of the second connector P2 (rows A and C) are user-definable. A central message processor may occupy the first slot (slot 1) in the chassis. If more processing power is required, additional message processors can be added, preferably with no demodulator circuit boards between them.

To minimize the number of arbitration signal lines required, the /REQUEST signals from all the demodulator channels assigned to detect and demodulate inbound signals with a particular spreading sequence can be wire ORed together on one signal line, and driven with open-collector drivers (or tri-state drivers whose outputs are only driven during the "request") on each demodulator circuit board. The corresponding /BUSY signals are routed the same way. The "grant" signal from the arbitration circuit for a particular spreading sequence in a daisy-chain are relayed by connecting /GRANT OUT signals to /GRANT IN signals in the next circuit board slot. Each successive circuit board will either pass the "grant" signal if it was not asserting a request, or block the "grant" signal from propagating further down the chassis if it was asserting a request. 32 signal pins are required on each demodulator circuit board P2 connector to implement the arbitration circuit functions using this scheme: eight /REQUEST lines, eight /BUSY lines, and eight sets of /GRANT OUT lines and /GRANT IN lines.

Figure 7:
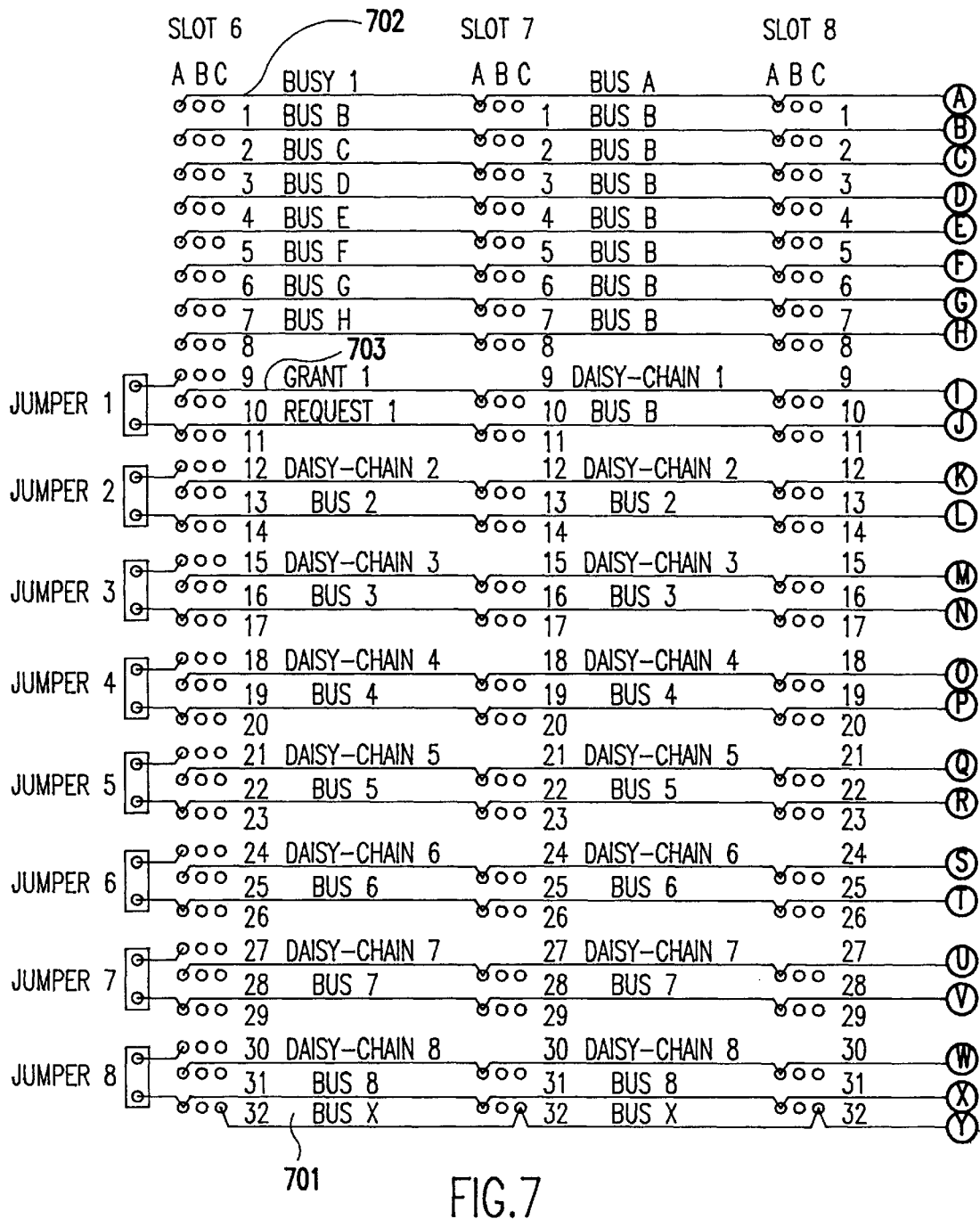
FIG. 7 is an illustration of the wiring on a printed circuit backplane such as a VME bus P2 backplane for arbitration request, busy, and grant signals, according to a preferred embodiment of the present invention.
Figure 7A:
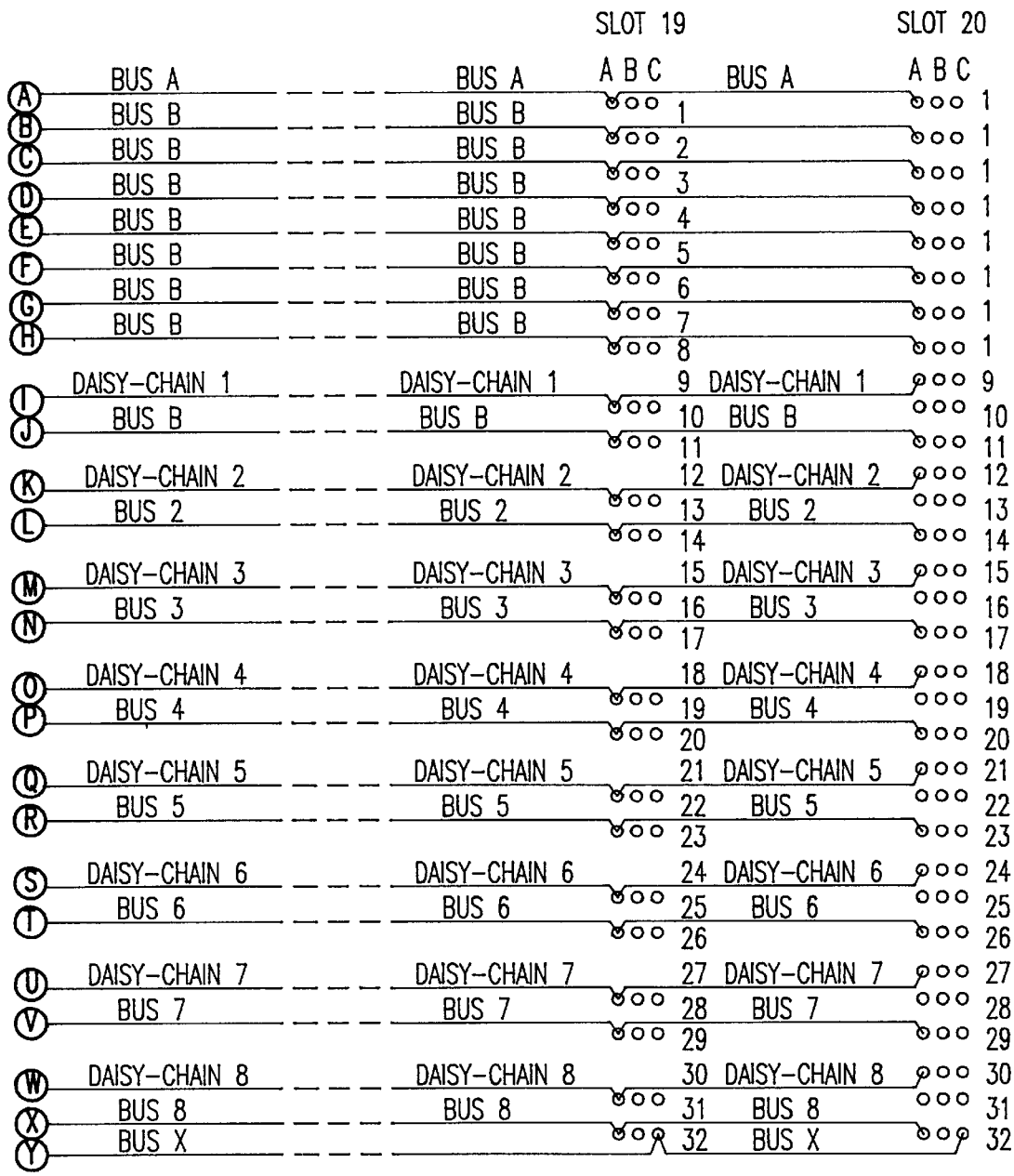

One way of routing the signals from the arbitration circuit signals from the demodulator channels to the point at which the "request" signal is echoed as the "grant" signal would be to use a custom P2 backplane in the demodulator chassis. A possible layout configuration is shown in FIG. 7. The /REQUEST lines 701 and the /BUSY lines 702 are bussed to all of the connectors, while the /GRANT OUT signals from slot n are connected to the /GRANT IN signals of slot n+1 703. This figure should be viewed as an illustration of the signal routing scheme, rather than as an electrical design recommendation.

Another approach is to use the type of P2 backplane that has bussed signals on the center row (Row B) of the connectors, and uncommitted pins on Rows A and C. This backplane has provisions for plugging a connector onto the back of P2 on each slot. In alternate embodiments, an arbitration circuit connector board can be designed to plug into the back of the P2 connectors on the demodulator circuit board card slots. It is also possible to daisy-chain the signals between the arbitration circuit connector boards and the point at which the "request" signal is echoed as the "grant" signal using ribbon cables. This approach preserves chassis flexibility. Whichever design is used, the interconnections should be designed with the short-pulse nature of the "request," "busy," and "grant" signals in mind.

Another implementation question that must be addressed is how to "echo," or turn around, the "request" signals as "grant" signals on the demodulator board slot closest to slot 1 in the chassis. There are four possible approaches: (1) route the "request" signal for each level to the associated "grant" signal on the P2 backplane; (2) route the "request" signal for each level to the associated "grant" signal on a special arbitration circuit connector board; (3) route the "request" signal for each level to the associated "grant" signal on the demodulator board in the slot closest to slot 1 in the chassis using a jumper block; or (4) route the "request" signal for each level to the associated "grant" signal on the demodulator board in the slot closest to slot 1 in the chassis using logic circuits that are enabled by software configuration. The third method is preferred for cost and complexity reasons.

There are some implications in the foregoing about the design of the demodulator circuit board. One implication is that since two demodulator channels on one board can receive the same or different spreading sequences, they must therefore be programmable to use the same or different arbitration circuit "request," "busy," and "grant" signal lines. Another implication is that the propagation delay inserted by each demodulator circuit board in the "grant" signal (between "grant-in" and "grant-out") must be very short. A third implication is that the preamble detectors in all of the demodulator circuit boards in a single demodulator chassis need to be synchronized for optimal operation.

The demodulator channels must de-assert the "busy" signal when any of the following conditions occurs: (1) the first part of the preamble is detected, but the unique word is not detected within a certain number of symbols; (2) the preamble is detected through the unique word, but the burst, or a cyclic-redundancy-check (CRC) block therein, fails a CRC check; or (3) the burst is over, as indicated by the measured burst length exceeding the burst length signaled by a burst length indicator in the beginning of the message.

What is claimed is:

1. A method for receiving and processing burst-mode code-division multiple access (CDMA) direct-sequence spread-spectrum (DSSS) signals, the method comprising the steps of:

receiving a data signal at first through $k^{th}$ demodulators, the first through $k^{th}$ demodulators being set in a first enumerated order and divided into a set of m ready demodulators and a set of n busy demodulators, the ready demodulators being set in a second enumerated order analogous to their order in the first enumerated order;

detecting a preamble in the data signal at the ready demodulators;

sending one or more request signals respectively as a grant signal from the ready demodulators to a first ready demodulator, first in the second enumerated order;

processing the data signal by the first ready demodulator; and moving the first ready demodulator from the set of ready demodulators to the set of busy demodulators, wherein k is an integer greater than one, m is an integer greater than zero and less than or equal to k, n is an integer less than or equal to k, and m plus n equals k.

2. A method for receiving and processing burst-mode code-division multiple access (CDMA) direct-sequence spread-spectrum (DSSS) signals, as recited in claim 1, wherein the step of sending a grant signal to the first ready demodulator is carried out by sending the grant signal through all of the n busy demodulators that are lower in the first enumerated order than the first ready demodulator.

3. A method for receiving and processing burst-mode code-division multiple access (CDMA) direct-sequence spread-spectrum (DSSS) signals, the method comprising the steps of:

receiving a signal at first through $k^{th}$ demodulators, the first through $k^{th}$ demodulators being set in a first enumerated order and divided into a set of m ready demodulators and a set of n busy demodulators, the ready demodulators being set in a second enumerated order analogous to their order in the first enumerated order;

detecting a preamble in the signal at the ready demodulators;

sending one or more request signals respectively from the ready demodulators to an arbitrator;

sending a grant signal from the arbitrator to a first ready demodulator, first in the second enumerated order;

processing the signal by the first ready demodulator; and moving the first ready demodulator from the set of ready demodulators to the set of busy demodulators, wherein k is an integer greater than one, m is an integer greater than zero and less than or equal to k, n is an integer less than or equal to k, and m plus n equals k.

4. A method for receiving and processing burst-mode code-division multiple access (CDMA) direct-sequence spread-spectrum (DSSS) signals, as recited in claim 3, wherein the step of sending a grant signal from the arbitrator to a first ready demodulator is carried out by sending the grant signal through all of the n busy demodulators that are higher in the first enumerated order than the first ready demodulator.

5. A signal receiving and demodulating system, comprising:

first through $k^{th}$ demodulators, arranged in an enumerated order, each having an IF signal input for receiving an IF signal, an $i^{th}$ request signal output, an $i^{th}$ busy signal output, an $i^{th}$ grant signal input, and an $i^{th}$ grant signal output, wherein each of the first through $k^{th}$ demodulators are in either a busy state in which they provide the $i^{th}$ busy signal from the $i^{th}$ busy signal output, or are in a ready state, wherein all ready-state demodulators provide the $i^{th}$ request signal at the $i^{th}$ request signal output upon detecting a preamble in the IF signal, wherein the highest ready-state demodulator in the enumerated order receives the $i^{th}$ grant signal at the $i^{th}$ grant signal input, provides no signal at the $i^{th}$ grant signal output, and is moved into a busy-state to process the IF signal, wherein all of the busy-state demodulators of a higher enumerated order than the highest-ordered ready-state demodulator receive the $i^{th}$ grant signal at the $i^{th}$ grant signal input and provide the $i^{th}$ grant signal at the $i^{th}$ grant signal output, and wherein k is an integer greater than 1 and i is an integer that varies between 1 and k, but remains constant for each of the first through $k^{th}$ demodulators.

6. A signal receiving and demodulating system, as recited in claim 5, further comprising:

an arbitrator having k request signal inputs for receiving the first through $k^{th}$ request signals, k busy signal inputs for receiving the first through $k^{th}$ busy signals, and k grant signal outputs for providing a grant signal in response to at least one of the first through $k^{th}$ request signals.

7. A signal receiving and demodulating system, as recited in claim 5, wherein the first demodulator receives the first grant signal from at least one of the second through $k^{th}$ demodulators.

8. A local arbitration circuit in a demodulator, comprising:

a detector for providing a preamble detection signal when the demodulator is in a ready state, and the detector detects a preamble in an incoming IF signal;

a first gate for providing a request signal in response to the preamble detection signal when the demodulator is in the ready state;

a second gate for receiving a grant input signal and providing a grant output signal when the demodulator is in a busy state;

a busy signal generator for providing a busy signal when the demodulator is in the busy state;

a switching circuit for changing the demodulator to the busy state when it receives the preamble detection signal and the grant-in signal, and for changing the demodulator into a ready state when it receives an end-of-burst signal indicating that the incoming IF signal is completely demodulated.

* * * * *